US012387865B2

(12) United States Patent
Jitaru et al.

(10) Patent No.: US 12,387,865 B2
(45) Date of Patent: Aug. 12, 2025

(54) HIGH DENSITY MAGNETIC STRUCTURE

(71) Applicant: Rompower Technology Holdings, LLC, Tucson, AZ (US)

(72) Inventors: Ionel Jitaru, Tucson, AZ (US); Iulian Busu, Măgurele (RO); Mihai Bogdan Jitariu, Neamt (RO)

(73) Assignee: Rompower Technology Holdings, LLC, Tucson, AZ (US)

( * ) Notice: Subject to any disclaimer, the term of this patent is extended or adjusted under 35 U.S.C. 154(b) by 0 days.

(21) Appl. No.: 18/537,511

(22) Filed: Dec. 12, 2023

(65) Prior Publication Data

US 2024/0105376 A1 Mar. 28, 2024

Related U.S. Application Data

(63) Continuation of application No. 18/077,979, filed on Dec. 8, 2022, now Pat. No. 11,842,835.

(60) Provisional application No. 63/265,120, filed on Dec. 8, 2021.

(51) Int. Cl.
*H01F 27/00* (2006.01)
*H01F 27/30* (2006.01)
*H01F 27/32* (2006.01)

(52) U.S. Cl.
CPC ......... *H01F 27/006* (2013.01); *H01F 27/306* (2013.01); *H01F 27/325* (2013.01)

(58) Field of Classification Search
CPC ..... H01F 27/006; H01F 27/306; H01F 27/325
See application file for complete search history.

(56) References Cited

U.S. PATENT DOCUMENTS

| | | | | |
|---|---|---|---|---|
| 11,562,854 | B1 * | 1/2023 | Kaelin | H01F 41/063 |
| 2003/0227365 | A1 * | 12/2003 | Chen | H01F 27/2823 336/182 |
| 2014/0028433 | A1 * | 1/2014 | Kim | H01F 27/2866 336/84 R |
| 2014/0266530 | A1 * | 9/2014 | Andres | H01F 27/306 336/170 |
| 2016/0359426 | A1 * | 12/2016 | Jitaru | H05K 1/0256 |
| 2017/0004920 | A1 * | 1/2017 | Pan | H01F 27/2885 |
| 2017/0032888 | A1 * | 2/2017 | Park | H01F 27/325 |
| 2017/0047159 | A1 * | 2/2017 | Itoh | H01F 27/306 |
| 2018/0192486 | A1 * | 7/2018 | Khananshvili | H01F 41/069 |
| 2018/0254143 | A1 * | 9/2018 | Yang | H01F 27/325 |
| 2019/0008535 | A1 * | 1/2019 | Valet | A61B 17/225 |
| 2019/0311846 | A1 * | 10/2019 | Ren | H01F 27/306 |
| 2019/0392982 | A1 * | 12/2019 | Lin | H01F 27/325 |
| 2020/0105461 | A1 * | 4/2020 | Fu | H01F 27/325 |
| 2021/0083590 | A1 * | 3/2021 | Lu | H01F 38/08 |

(Continued)

FOREIGN PATENT DOCUMENTS

| | | | | |
|---|---|---|---|---|
| CN | 110635663 A | * 12/2019 | | H01F 27/24 |
| WO | WO-2021154048 A1 | * 8/2021 | | H01F 27/22 |

*Primary Examiner* — Malcolm Barnes
(74) *Attorney, Agent, or Firm* — Thomas W. Galvani, P.C.; Thomas W. Galvani

(57) ABSTRACT

A magnetic assembly formed by a custom magnetic core and its bobbin with interconnection pins is presented. This magnetic assembly leads to a higher power density of magnetic assembly and a better utilization of the volume inside a power converter, allowing a higher power density of the power converter and a higher efficiency through the minimization of the parasitic inductances.

2 Claims, 7 Drawing Sheets

(56) References Cited

U.S. PATENT DOCUMENTS

2021/0203136 A1* 7/2021 Shono .................. H01F 27/325
2022/0093315 A1* 3/2022 Nam ......................... H01F 3/14

* cited by examiner

HIGH DENSITY MAGNETIC STRUCTURE

CROSS-REFERENCE TO RELATED APPLICATIONS

This application is a continuation of and claims priority to prior U.S. patent application Ser. No. 18/077,979, filed Dec. 8, 2022, which claims the benefit of U.S. Provisional Application No. 63/265,120, filed Dec. 8, 2021, both of which are hereby incorporated by reference in their entireties.

FIELD

This disclosure relates generally to power converters particularly the AC to DC power adapter. A converter having strategically improved packaging in heightening the power density by tackling the overall construction of the housing and reducing the size.

BACKGROUND

The power adapter market is constantly evolving and pushing producers towards higher power density adapter development. A key component in a power adapter is the transformer which occupies a large volume/footprint in the case. There is a need to reduce the volume/footprint of the transformer so as to increase the power density and also reduce the size of the adapter.

SUMMARY

The below disclosure describes, in part, providing high power density in converters by reducing the footprint/volume of the transformer. A method to decrease the footprint of the transformer structure includes optimizing the utilization of the volume of the transformer. In addition, in an embodiment, the secondary windings are placed close to each other via a secondary slot implemented in one of the outer legs. That method decreases the stray inductance and increases the efficiency of the power converter wherein this transformer structure is implemented. Furthermore, an embodiment of a transformer structure presented in this specification can be placed along to the edge of the PCB which is the support for the power converter wherein the transformer structure is used. This allows a better distribution for the rest of the components in order to increase the power density.

In an embodiment, a transformer assembly has a primary and a secondary side and has a width and a length. The transformer assembly includes a magnetic core having a center leg and two outer legs and two openings, wherein one of the openings is dedicated to primary winding and defines a primary opening, and another of the openings is dedicated to the secondary winding and defines a secondary opening. A bobbin contains both primary windings, secondary windings and primary and secondary auxiliary windings. The bobbin further contains primary pins placed towards the primary opening, which are connected to the primary windings and to the primary auxiliary windings. A secondary winding is extracted through the secondary opening.

In embodiments of a transformer assembly, the center leg of the magnetic core is shifted along the width of the transformer assembly towards the primary opening in such a way that the bobbin is substantially covered by the magnetic core towards the secondary opening. The center leg has an oval shape, wherein a larger dimension of the oval shape is oriented towards the primary and secondary openings, and a distance in between the center leg and the outer legs is maintained constant around a circumference of the center leg. In embodiments, a sum of a cross-sectional area of the outer legs is at least 3% larger than a cross-sectional area of the center leg.

In an embodiment, a transformer assembly has a primary and a secondary side and having a width and a length. The transformer assembly includes a magnetic core having a center leg and two outer legs and two openings, wherein one of the openings is dedicated to primary winding and defines a primary opening, and another opening is dedicated to the secondary winding and defines a secondary opening. One of the outer legs is split in two sections, wherein a space between the two sections defines a secondary slot and is used for extraction of the secondary windings. A bobbin contains primary windings and primary auxiliary windings. The bobbin further contains primary pins placed towards the primary opening, which are connected to the primary windings and to the primary auxiliary windings.

In embodiments of the transformer assembly, the center leg of the magnetic core is shifted along the width of the transformer assembly towards the primary opening in such a way that the bobbin is substantially covered by the magnetic core towards the secondary opening. The center leg has an oval shape, wherein a larger dimension of the oval shape is oriented towards the primary and secondary openings, and a distance in between the center leg and the outer legs is maintained constant around a circumference of the center leg. A sum of a cross-sectional area of the outer legs is at least 3% larger than a cross-sectional area of the center leg.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

Figure 1:
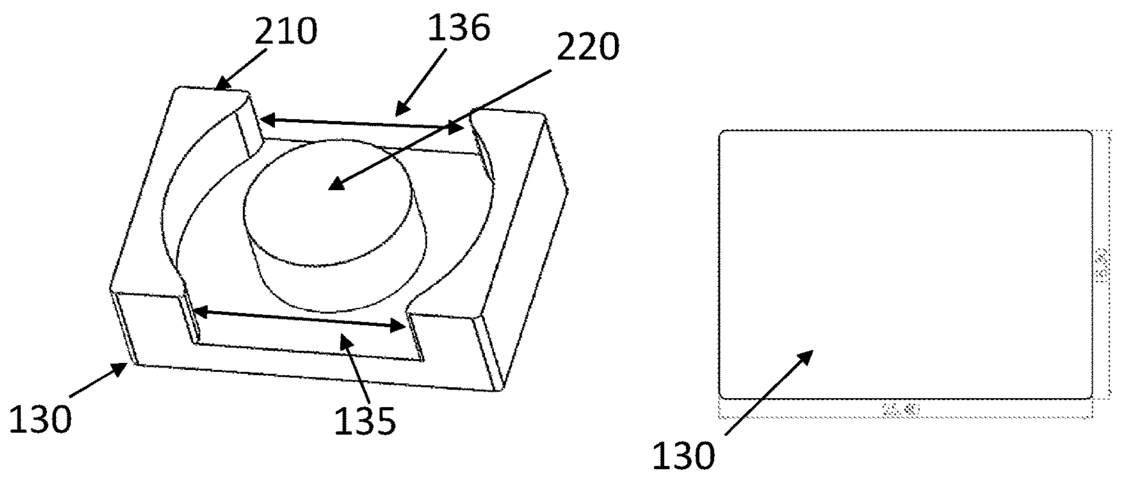
FIG. 1 shows an EQ 25 standard E core (130), Top view (left) with a central leg (220) and outer legs (210), and Bottom View (right)
Figure 1A:
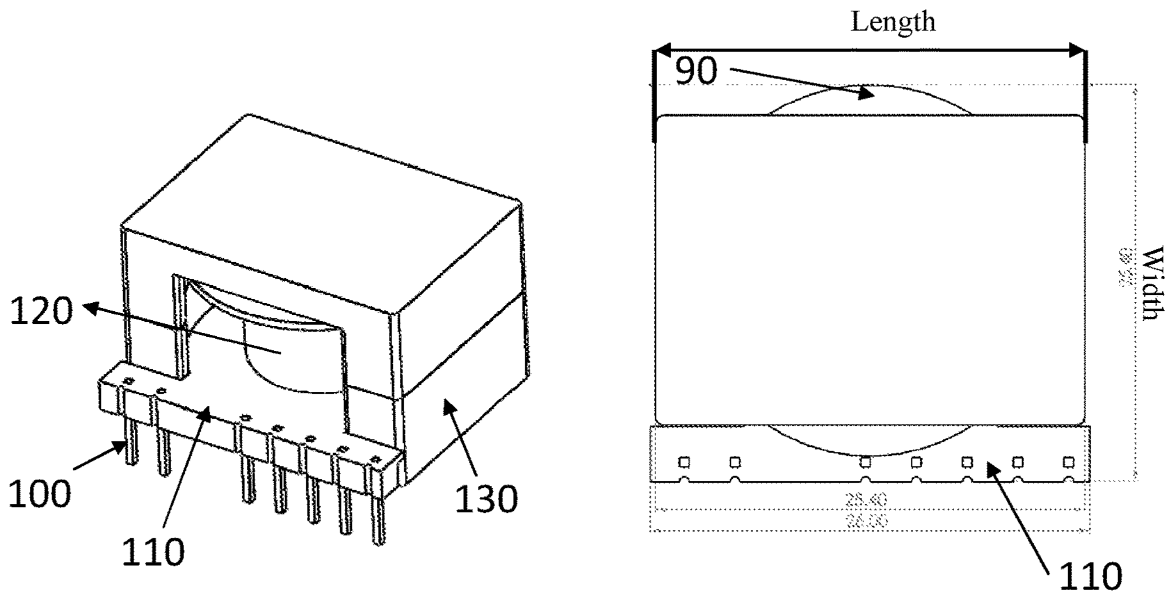
FIG. 1A shows an EQ 25 Transformer, General view (left) showing the bobbin (120) and primary pins (110), and Bottom View (right)

wherein some of the drawings include transparencies to show relative arrangement of components.

DETAILED DESCRIPTION

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

An embodiment of a high density magnetic structure disclosed in this specification increases the power density of a converter by decreasing the footprint/volume of the transformer. A standard common core, EQ25 (FIG. 1) was the starting point. This standard E type core does have a center leg (220) and two outer legs (210). In the standard bobbin used with an E type core there is an area referred as primary area (110) wherein the inserted pins are connected to the primary winding and the auxiliary windings which are reported to the primary in respect of safety. To respect the safety distance the primary area and the secondary area are placed to a safety distance from each other. In cases therein the magnetic core 130 is small and there is not room to accommodate the primary area and secondary area (90) on the same side of the core. In such cases the primary area (110) is located to one side of the opening of the core (135) and the other side of the opening of the core (136) is dedicated to the secondary winding. In a standard EQ25 or other E type core the space on top of the primary (110) and secondary connections (90) is unused.

Figure 2:
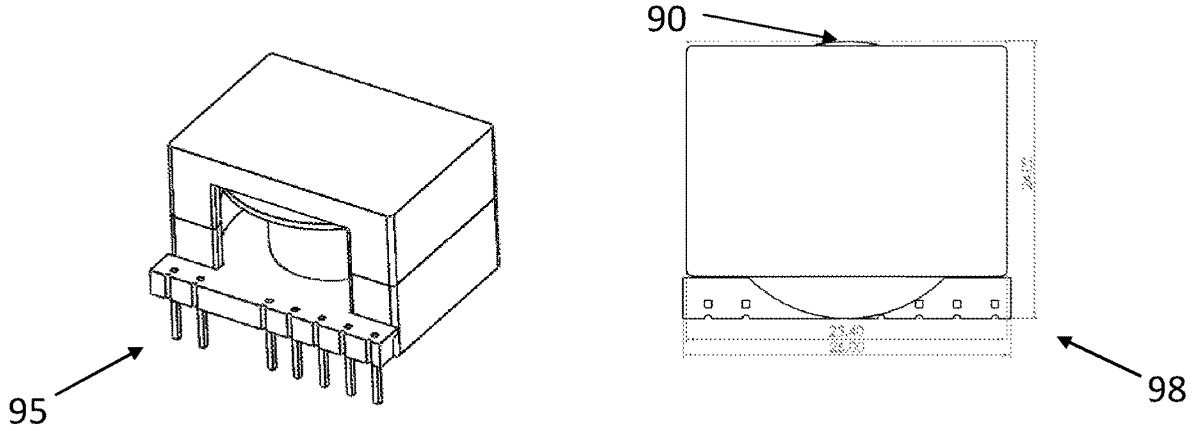
FIG. 2 shows an EQ25 with central leg offset Top View (left) and Bottom View (right)
Figure 3:
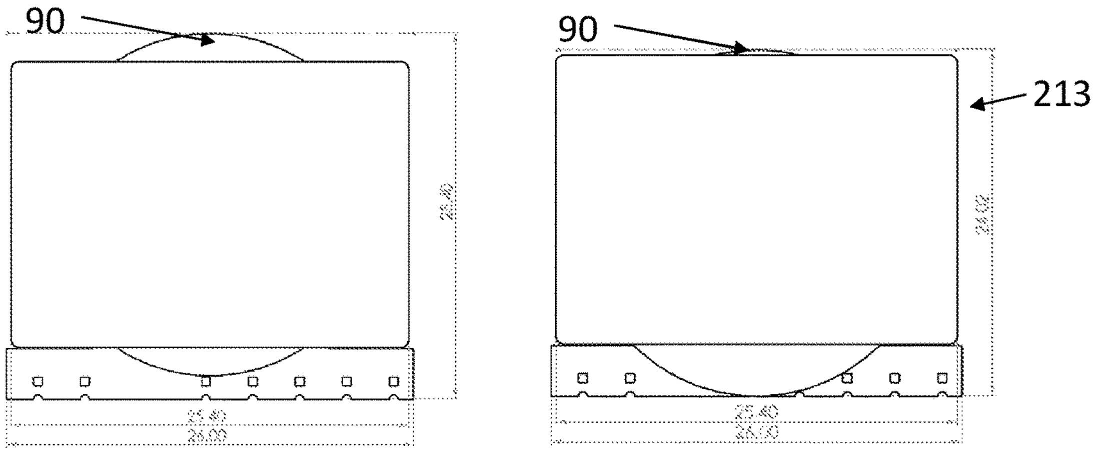
FIG. 3 shows a top view, comparison of two EQ25 Transformers, the Standard transformer (left) and the transformer with an offset central leg (right)

In the embodiment #1, the central leg (220) is shifted towards the primary area (100). As a result, the bobbin will be substantially covered by the magnetic core (130) on the secondary area. This is depicted by the reference character 98 from FIG. 2. At the reference character 98 the secondary area 90 is totally under the magnetic core 130, while the bobbin is on top of the primary area 110 as shown at reference character 98 in FIG. 2 and reference character 213 in FIG. 3.

Figure 4:
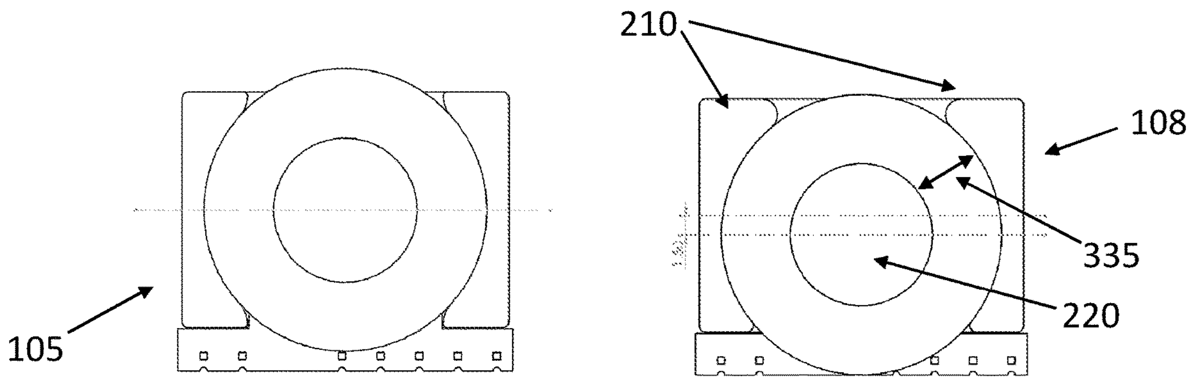
FIG. 4 shows top cross section central leg view, comparison of two EQ25 Transformers, Standard transformer (left) and the transformer with the offset central leg (right)

The reference character 95 presents the top view of the original configuration and the reference character 98 presents the configuration based on the embodiments #1 of this specification. As can be seen the windings are not modified. The presented reduction in the footprint advantage comes with some magnetic flux asymmetry as a drawback, but not with a major impact of the overall transformer efficiency. As presented in the FIG. 4 the asymmetry of the central leg also reflects in outer legs (210) from the drawing 108 in comparison with drawing 105 from FIG. 4. This modification of the outer legs (210) is necessary in order to maintain the same flux density through the outer legs (210). In this way the winding window is the same as in the standard core. The winding area is the area which is occupied by the winding (335) at the reference character 108 in FIG. 4. In order to reduce the negative impact of the magnetic flux asymmetry such as higher flux density, the area of the outer legs (210) combined, is bigger than the aria of the central leg (220).

As a result of the embodiment #1, only the width of the transformer was reduced and the central leg (220) area was the same on both configurations, the standard core EQ25 and the custom core, according to one embodiment of this disclosure.

Figure 5:
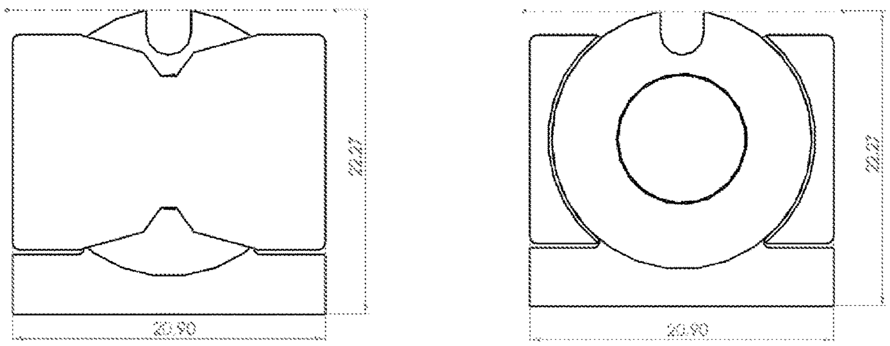
FIG. 5 shows standard PQ20/16 Transformer, Transformer Top View (left) and Transformer cross section Central Leg View (right)
Figure 6:
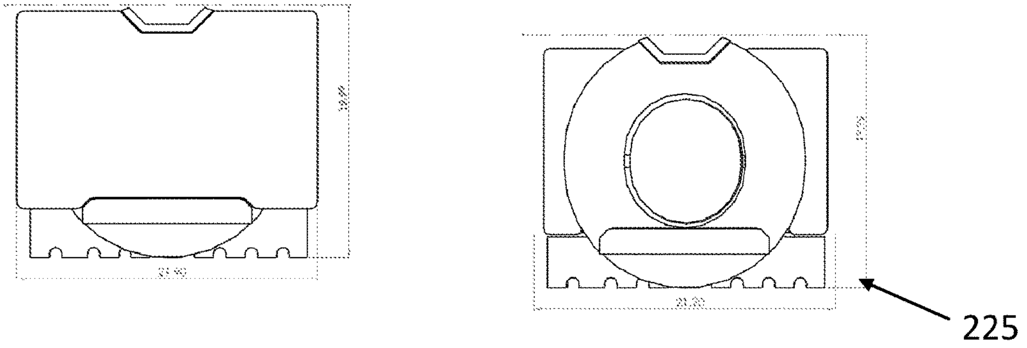
FIG. 6 shows modified Transformer based on PQ20/16 standard version, Transformer Top View (left) and Transformer cross section Central Leg View (right)

In order to increase the efficiency of the transformer the cross-section of the center leg (220) and outer legs (210) may be modified. However, the modification of the cross-section of the center leg and outer legs shall be done in such a way that the winding area (335) shall be maintained, as it would be in a standard core. For this a PQ20/16 was use a reference from FIG. 5. Based on the PQ20/16 dimensions and leg areas, a new core was created but with a 10% increase in the central leg (220) area, FIG. 6 and with the area of the outer leg (210) combined bigger that the area of the central leg. The tradeoff for this transformer was an increase in the length with one millimeter, but in the same time gaining 2.27 millimeters in width.

In the embodiment #2, the cross-section of the center leg (220) is increased. A 10% increase of the central leg cross-section (220) area was possible by changing the shape of the original central leg, but at the same time keeping the winding area as in the standard core, with minimal increase in length. This is depicted in the drawing 225 from FIG. 6.

Figure 7:
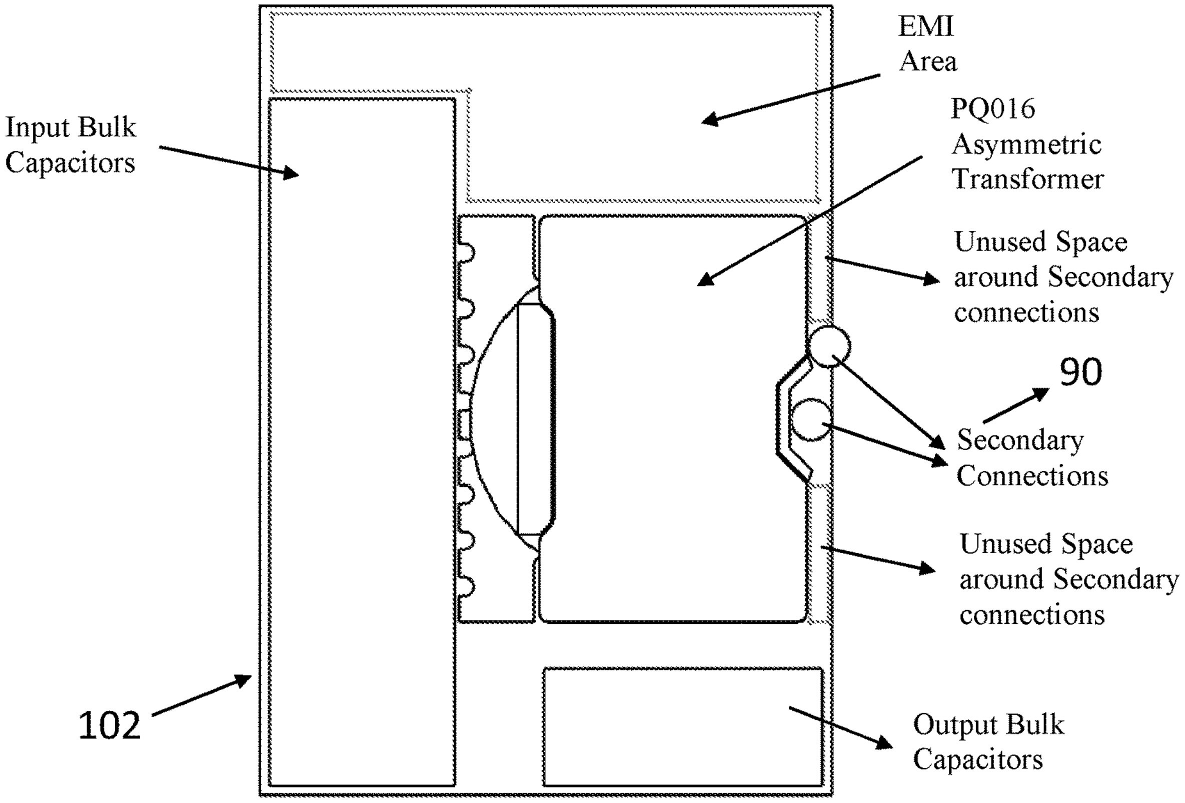
FIG. 7 shows general High-Density Package (102) with edge placed transformer.

In a situation where a high-density package with a certain length and width is needed the transformer is pushed toward one of the board edges. In this case the secondary connections (90), located at 180 degrees from the primary connections (100), and are also pushed at the edge at the board or sometimes outside the board, FIG. 7. In the FIG. 7, an asymmetric type of core is shown, according to the embodiments #1 and #2 of this specification. As can be seen, the secondary connections are falling out of the board. In order to overcome the secondary connections, issue another custom core was created, as shown in FIG. 8.

Figure 8:
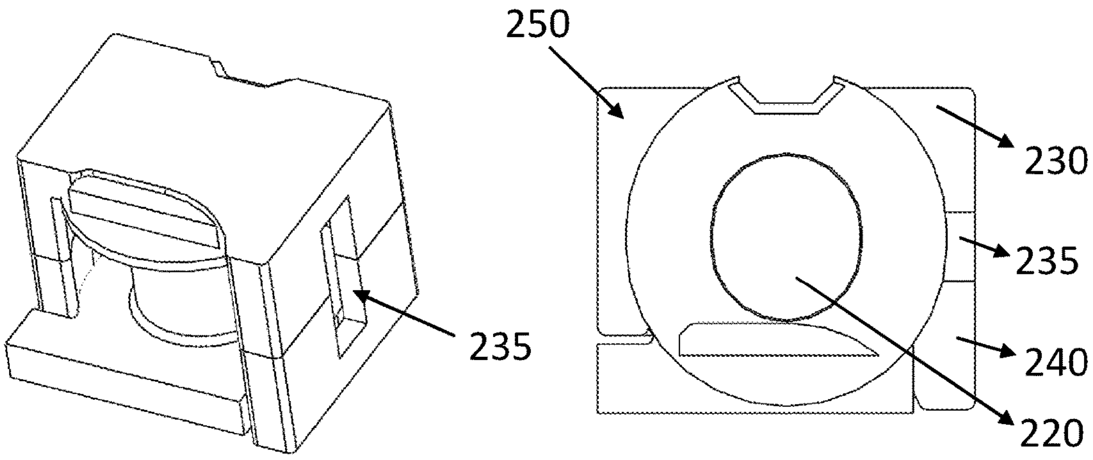
FIG. 8 shows transformer with Piano Shape Core, General View (left) and top cross section Central Leg View (right), showing the outer leg split (230) (240)

In the transformer assembly presented in the FIG. 8, all the above principles were used in creating the core shape. As can be seen the central leg (220) is oval and shifted toward the primary side (100). Area of the external legs combined is greater that the area of the central leg according to the embodiment #2. In order to be able to move the core as close as possible to the edge of the board, one of the external legs was split to make room for the secondary wires. In this case, one of the lateral legs is split in two sections (230) and (240) as depicted in FIG. 8. At this point, the secondary connections are placed at 90 degrees from the primary side (100).

Figure 9:
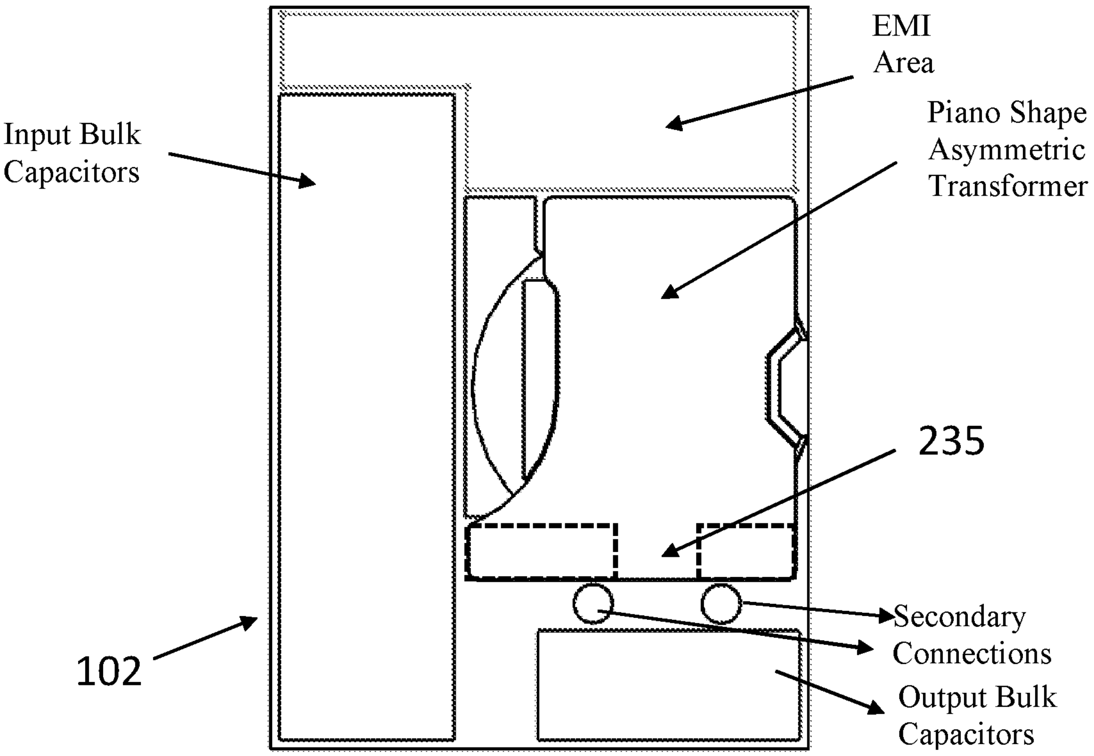
FIG. 9 shows general High-Density Package with edge placed Piano Shape Core Transformer.

The impact of an uneven flux density in the general performance of the transformer is minimal. As can be seen in FIG. 9, the transformer was moved as close as possible to the edge, and the secondary connection (90) is rotated 90 degrees. These modifications allow the transformer to get close to the edge define the embodiment #3 as depicted in FIG. 9.

Figure 10:
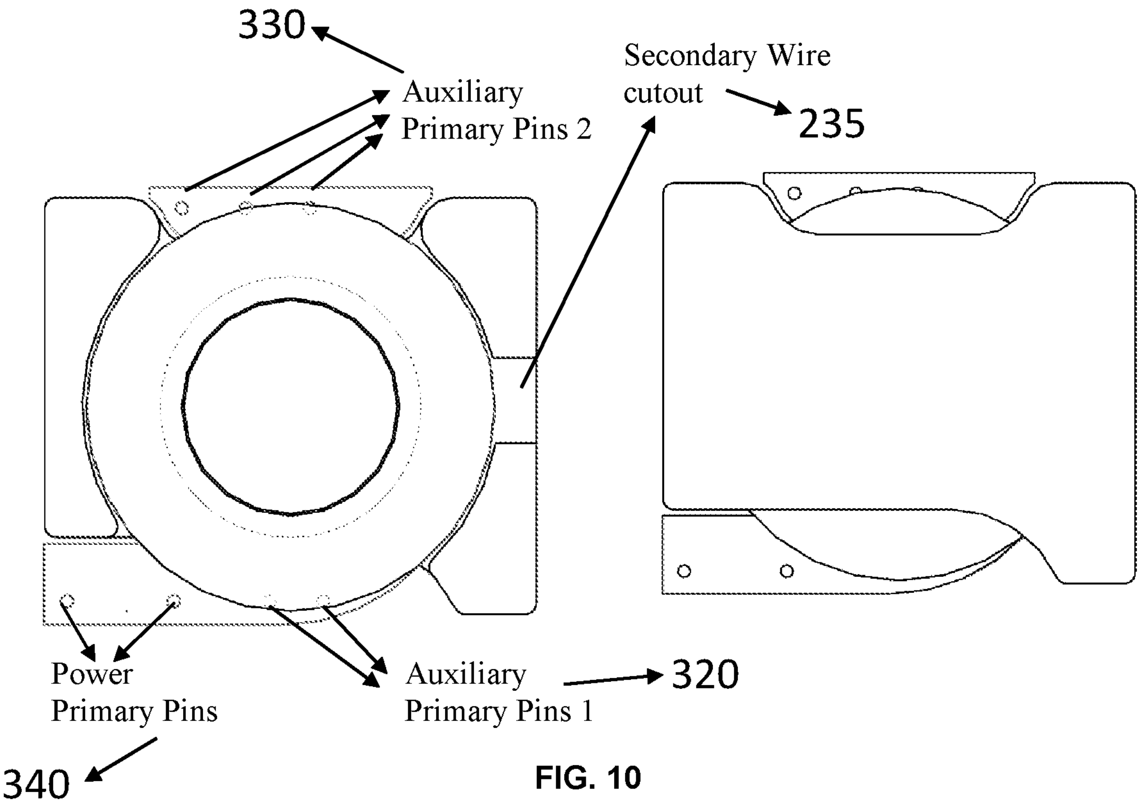
FIG. 10 shows transformer with Piano Shape Core Variation, Transformer cross section Central Leg View (left) and Transformer Top View (right)
Figure 11:
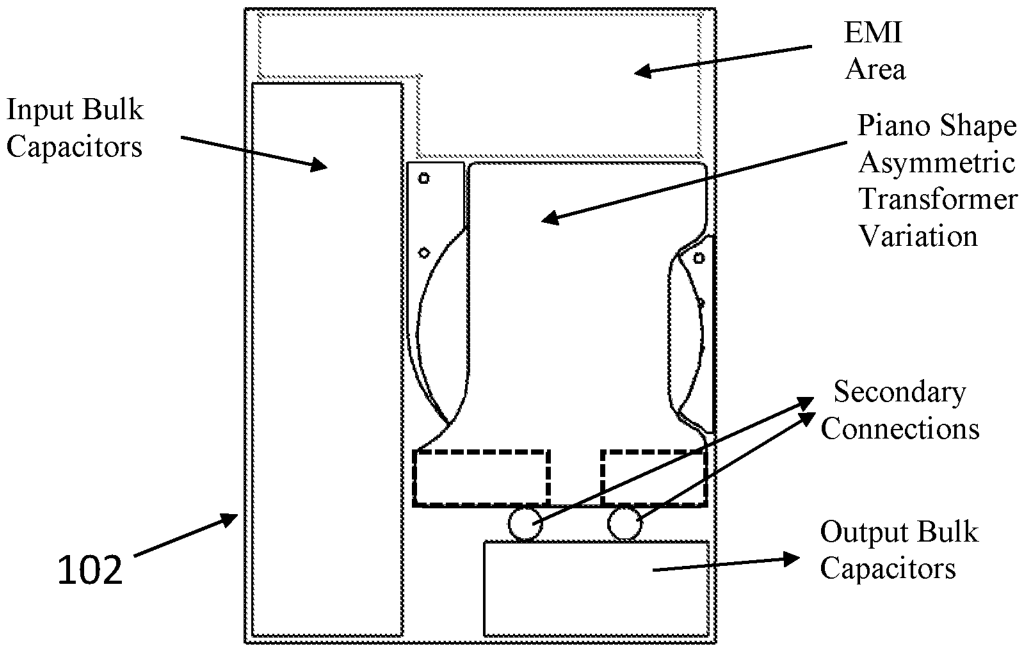
FIG. 11 shows general High-Density Package with edge placed Piano Shape Core Transformer Variation.

Usually in power adapters the connection of the secondary wires requires more space that the connection of the primary wires because the secondary wires are thicker. In a situation where a large number of pins are required in the primary side, a variation of the Piano shape transformer was developed as depicted in FIG. 10. The primary pins are placed on both sides of the core openings 135, 136. We can still place the transformer to the edge of the board and place some primary connections in the edge area, as shown in FIG. 10. In FIG. 10 there are presented two locations for the auxiliary primary pins, the auxiliary primary pins 1, (320), at the same side as the power primary pins (340) and the auxiliary primary pins 2 (330) at the opposite side of the power primary pins (340). In this embodiment, the secondary winding is placed through the cutout 235.

Figure 12:
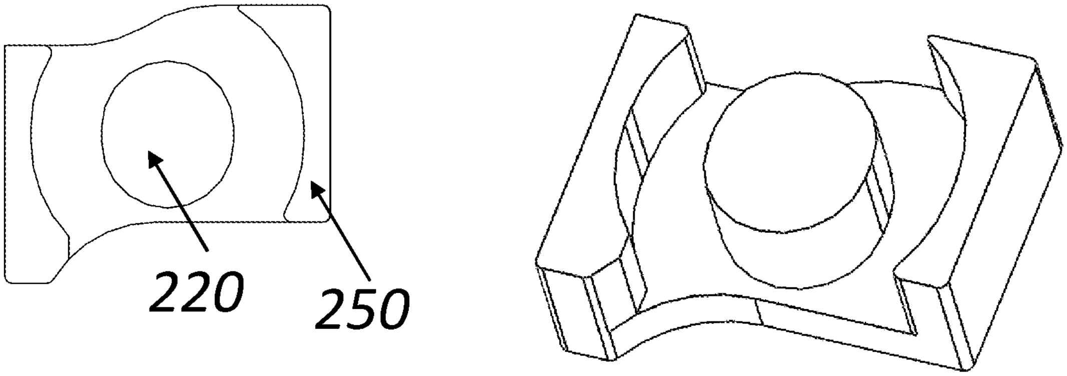
FIG. 12 shows Piano Shape Core Transformer Variation, Top View (left) and General View (right)
Figure 13:
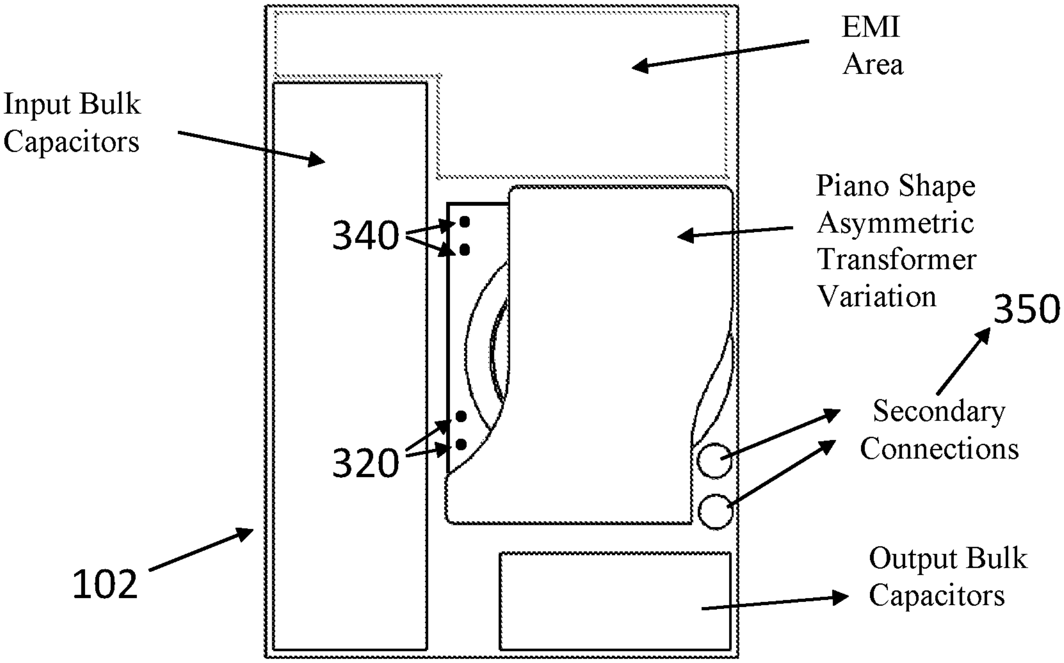
FIG. 13 shows general High-Density Package with edge placed Piano Shape Core Transformer other Variation.

Another variation of the piano shape core is depicted in FIG. 12. The S shape core utilization is depicted in FIG. 13. The primary power pins (340) and the primary auxiliary pins (320) are placed towards the center of the PCB (100) while the secondary windings (350) are placed towards the cutout of the PCB (100).

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A transformer assembly having a primary side and a secondary side and having a width and a length, the transformer assembly comprising:

a primary winding, a secondary winding, a primary auxiliary winding, and a secondary auxiliary winding;

a magnetic core having a center leg and two outer legs and two openings, wherein one of the openings is dedicated to primary winding and defines a primary opening, and another of the openings is dedicated to the secondary winding and defines a secondary opening;

a bobbin which contains the primary winding, the secondary winding, and the primary and secondary auxiliary windings;

wherein the center leg of the magnetic core is shifted along the width toward the primary opening in such a way that the bobbin is tangential to an imaginary straight line drawn to complete a side opposite the primary opening of the magnetic core;

the bobbin further contains primary pins placed towards the primary opening, which are connected to the primary winding and to the primary auxiliary winding; and the secondary winding is extracted through the secondary opening;

wherein the center leg has an oval shape, wherein a larger dimension of the oval shape is oriented towards the primary and secondary openings, and a distance in between the center leg and the outer legs is maintained constant around a circumference of the center leg; and wherein a sum of a cross-sectional area of the outer legs is at least 3% larger than a cross-sectional area of the center leg.

2. A transformer assembly having a primary side and a secondary side and having a width and a length, the transformer assembly comprising:

a primary winding, a secondary winding, a primary auxiliary winding, and a secondary auxiliary winding;

a magnetic core having a center leg and two outer legs and two openings, wherein one of the openings is dedicated to the primary winding and defines a primary opening, and another opening is dedicated to the auxiliary winding and defines an auxiliary opening;

one of the outer legs is split in two sections, wherein a space between the two sections defines a secondary slot and is used for extraction of the secondary winding only, wherein a cross-section of the one of the outer legs is substantially the same as a cross-section of the other of the outer legs;

a bobbin which contains the primary winding, the secondary winding, and the primary and secondary auxiliary windings; and the bobbin further contains primary pins, which are connected to the primary winding, and additional pins which are connected to the primary and secondary auxiliary windings;

wherein the center leg of the magnetic core is shifted along the width toward the primary opening in such a way that the bobbin is tangential with an imaginary straight line drawn to complete a side opposite the primary opening of the magnetic core;

wherein the center leg has an oval shape, wherein a larger dimension of the oval shape is oriented towards the primary and secondary openings, and a distance in between the center leg and the outer legs is maintained constant around a circumference of the center leg; and wherein a sum of a cross-sectional area of the outer legs is at least 3% larger than a cross-sectional area of the center leg.

* * * * *